United States Patent [19]

Mori et al.

[11] Patent Number: 5,294,984
[45] Date of Patent: Mar. 15, 1994

[54] VIDEO SIGNAL PROCESSING SYSTEM FOR PRODUCING INTERMEDIATE PIXEL DATA FROM NEIGHBORING PIXEL DATA TO IMPROVE IMAGE QUALITY

[75] Inventors: Ryoichi Mori, c/o Institute of Information Sciences and Electronics University of Tsukuba, 1-1, Tennodai, 1-chome, Tsukuba-shi, Ibaragi-ken; Kazuo Toraichi, Sayama; Masaru Kamada, Tsukuba, all of Japan

[73] Assignee: Ryoichi Mori, Tokyo, Japan

[21] Appl. No.: 819,812

[22] Filed: Jan. 13, 1992

Related U.S. Application Data

[63] Continuation-in-part of Ser. No. 383,358, Jul. 20, 1989, abandoned.

[30] Foreign Application Priority Data

Jul. 23, 1988 [JP] Japan .................... 63-183874

[51] Int. Cl.$^5$ ............................. H04N 5/14
[52] U.S. Cl. .................... 358/160; 348/625; 348/441; 345/136
[58] Field of Search ............... 358/160, 180, 140, 37, 358/166; 340/728, 731; H04N 5/14

[56] References Cited

U.S. PATENT DOCUMENTS

| | | | |
|---|---|---|---|
| 4,193,092 | 3/1980 | Stoffel | 358/136 |
| 4,631,751 | 12/1986 | Anderson | 340/731 |
| 4,774,581 | 9/1988 | Shiratsuchi | |
| 4,866,520 | 9/1989 | Nomura | 358/140 |

Primary Examiner—Victor R. Kostak
Assistant Examiner—Sherrie Hsia
Attorney, Agent, or Firm—W. G. Fasse

[57] ABSTRACT

A video signal processing system improves the image quality displayed in a CRT or printed by a video printer. In order to produce natural and fine video signals, pixel data corresponding to an intermediate position between two neighboring pixels, are produced from pixel data of the neighboring two pixels. The pixel data corresponding to the intermediate position is produced by a convolution operation with respect to the pixel data of the two neighboring pixels and a quantized value of an impulse response signal.

2 Claims, 11 Drawing Sheets

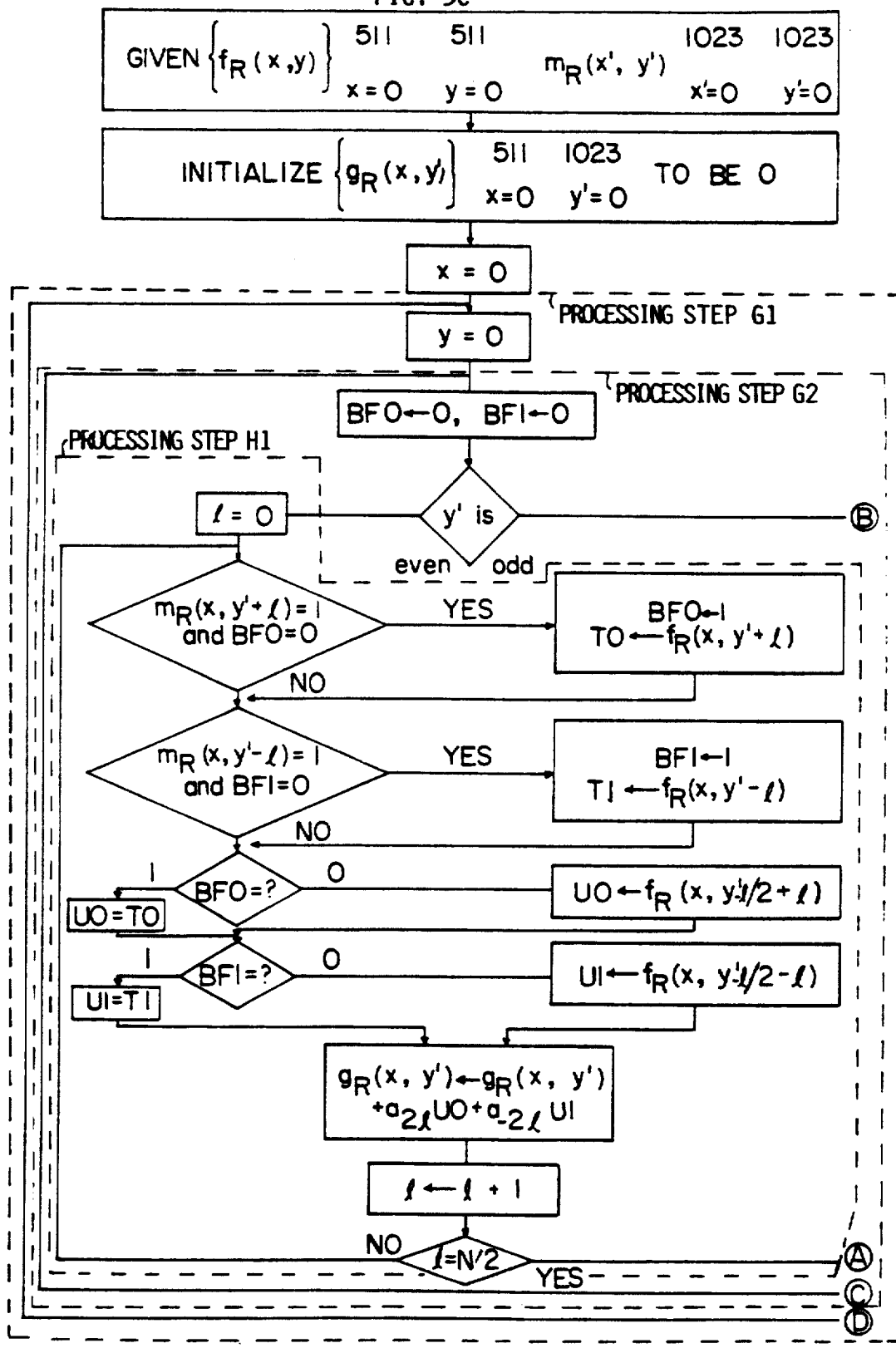

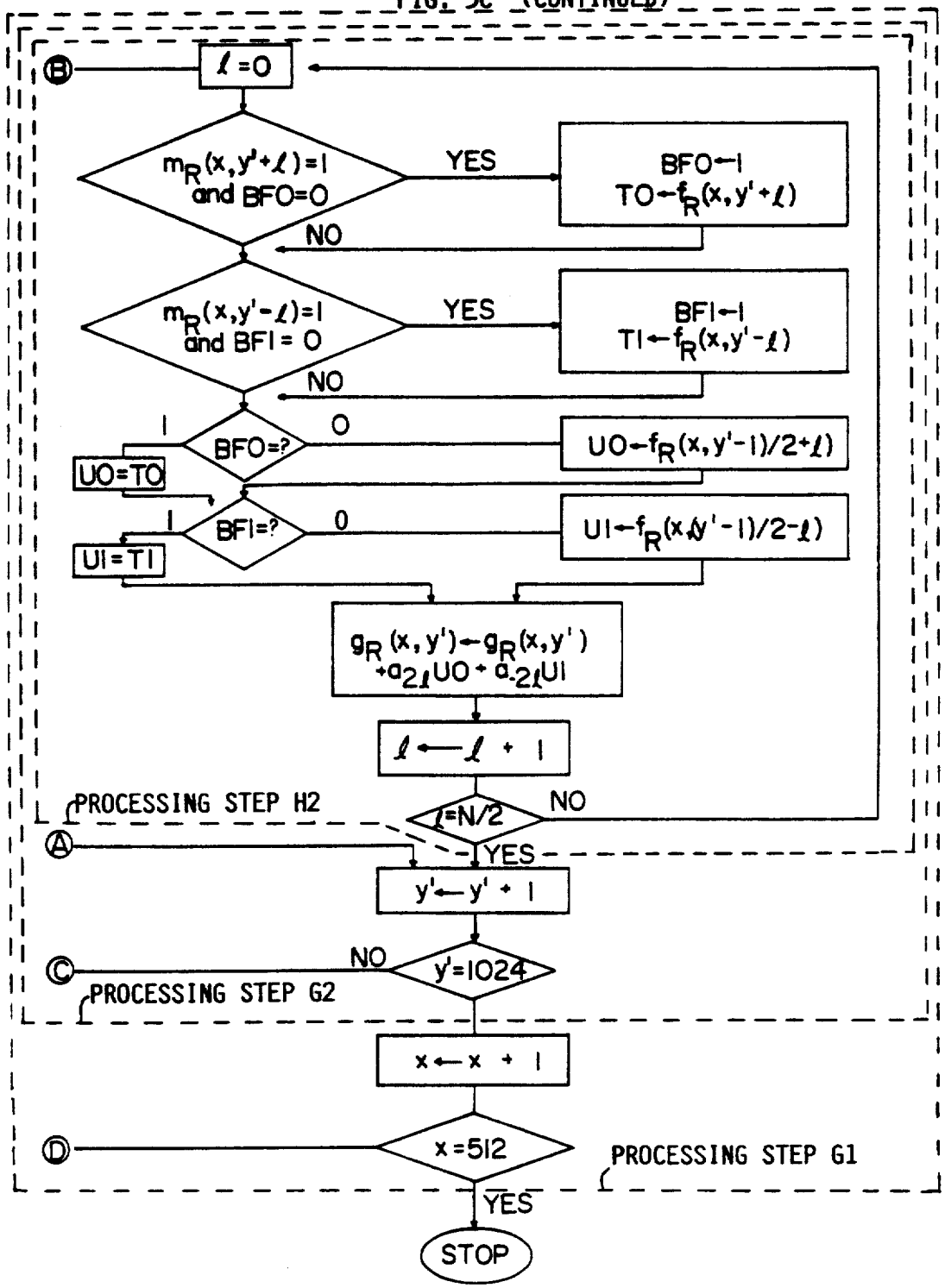

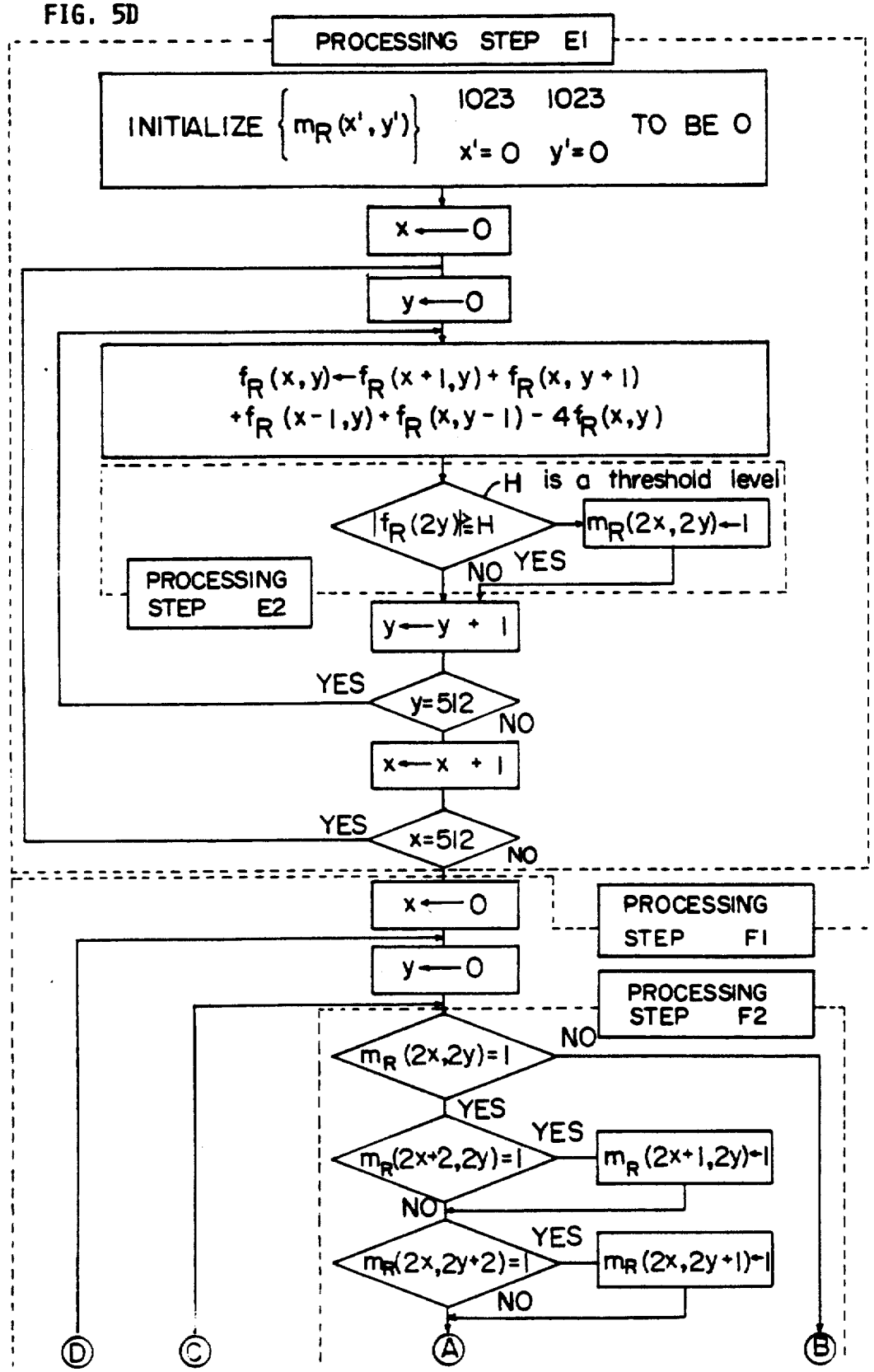

VIDEO SIGNAL PROCESSING SYSTEM FOR PRODUCING INTERMEDIATE PIXEL DATA FROM NEIGHBORING PIXEL DATA TO IMPROVE IMAGE QUALITY

CROSS-REFERENCE TO RELATED APPLICATION

The present Application is a continuation-in-part of my U.S. patent application 07/383,358, filed on Jul. 20, 1989; now abandoned.

INCORPORATION BY REFERENCE

The content of an article entitled "Improvement of Video Hardcopy Image Quality by Using Spline Interpolation" by Kazuo Toraichi et al., published in "Systems and Computers in Japan", Vol. 20, No. 9, 1989, translated from "Denshi Joho Tsushin Gakkai Ronbushi", Vol. 71-D, No. 7, Jul. 1988, pages 1276 to 1285 is incorporated herein to provide background information regarding the increase in image resolution by the application of spline interpolation.

FIELD OF THE INVENTION

The present invention relates to a video signal processing system for improving the quality of images displayed in a cathode ray tube (CRT) or printed by a video printer.

BACKGROUND INFORMATION

Heretofore, it has been contemplated to improve the quality of images displayed, for example, in a CRT. One approach for this purpose is to produce a quasi-video signal corresponding to an intermediate scanning line between two adjacent or rather neighboring scanning lines. The quasi-video signal is produced through an interpolation processing based upon the video signals corresponding to the two neighboring scanning lines. The ordinarily performed interpolation processing is such that an average value of the video signals between the neighboring scanning lines is computed to provide the quasi-video signal corresponding to the intermediate scanning line therebetween. Although the displayed image is fine as a whole, it gives a feeling of disorder to the viewer due to the fact that the quasi-video signal thus produced, is not derived from the real image.

U.S. Pat. No. 4,774,581 (Shiratsuchi) discloses an electronic circuit system for magnifying a video image to have the effect of a zoom lens by adding a value N to a stored N value in accordance with a modulo M operation to obtain a new stored value. The result is a magnification of the video image by a factor of M/N relative to the original unmagnified image. The determination of the magnification factor with the value N according to Shiratsuchi is not determined by the luminescence data of two neighboring pixels that are spaced from each other diagonally. Shiratsuchi interpolates along adjacent lines and does not teach any interpolation by a convolution operation.

SUMMARY OF THE INVENTION

It is an object of the invention to provide a video signal processing system in which natural and fine video signals are produced.

The above object has been achieved by a video signal processing system according to the invention, wherein means are provided for processing a video signal to produce pixel data corresponding to an intermediate position between adjacent two pixels from pixel data of two neighboring pixels which are characterized by luminance data, wherein the pixel data corresponding to the intermediate position is produced by a convolution operation with respect to the pixel data of the two neighboring pixels and a quantized value of an impulse response signal.

More specifically, the system according to the invention comprises an input terminal for receiving said video signal; image memory means coupled to said input terminal for storing the video signal; and interpolation means connected to said memory means for receiving said video signal from said image memory means, said interpolation means comprising means for performing a convolution operation with respect to said luminescence data of the pixels contained in the video signal and with respect to said impulse response signal, said interpolation means producing pixel data corresponding to said intermediate position between two neighboring pixels.

With the video signal processing system in which the convolution operation is performed, a natural and fine video signal can be produced.

BRIEF DESCRIPTION OF THE DRAWINGS

In order that the invention may be clearly understood, it will now be described, by way of example, with reference to the accompanying drawings, wherein:

FIGS. 5A to 5E show flow diagrams for explaining the operation of the present invention.

Figure 1:
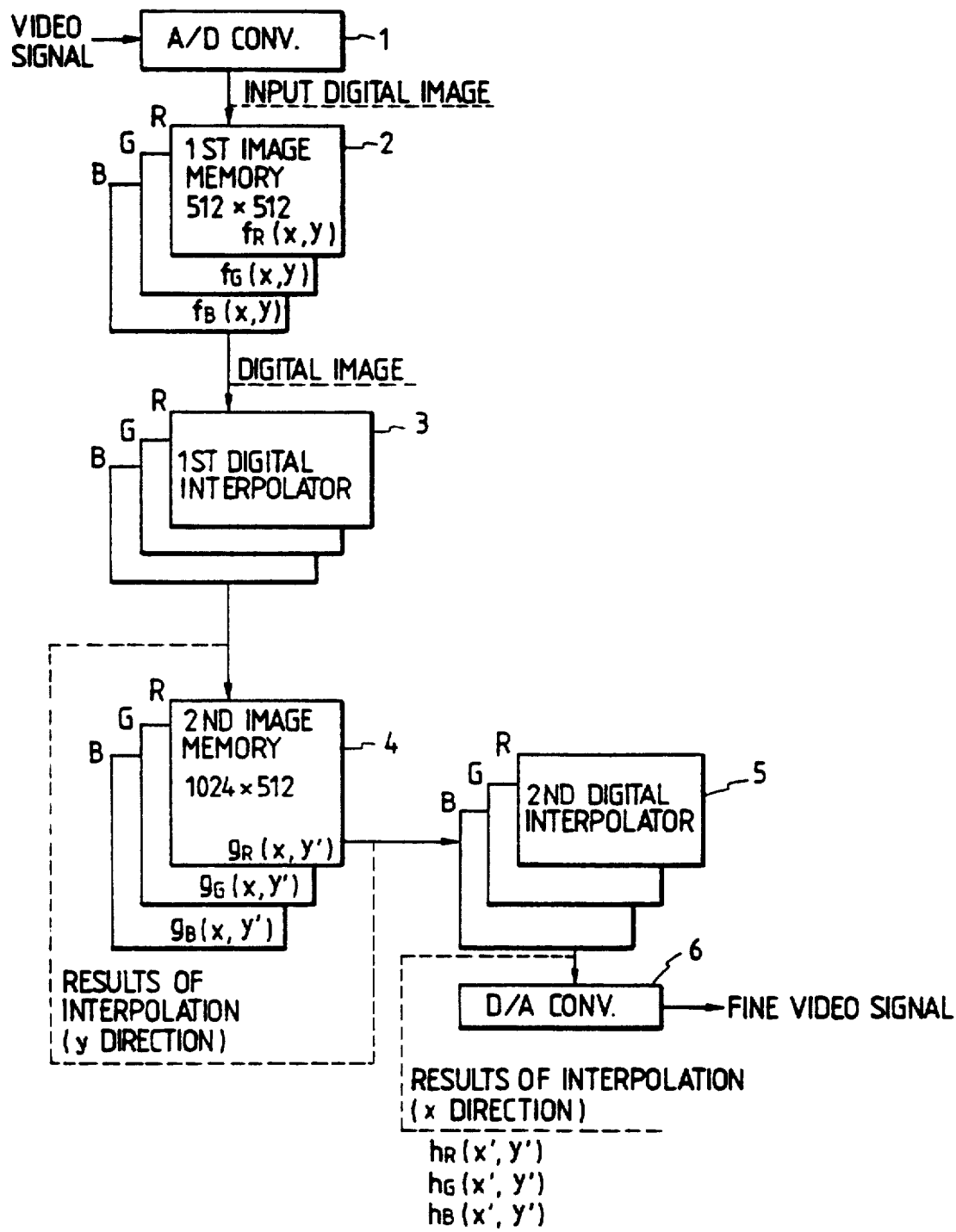
FIG. 1 is a block diagram showing a video signal processing system according to one embodiment of the present invention.

DETAILED DESCRIPTION OF PREFERRED EXAMPLE EMBODIMENTS AND OF THE BEST MODE OF THE INVENTION

A video signal processing system according to one embodiment of the invention will be described with reference to FIG. 1.

The present video signal processing system includes an analog-to-digital (A/D) converter 1 having an input terminal to which a video signal from a TV tuner or from a personal computer is applied. In the A/D converter 1, the video signal is subjected to sampling and quantization to thereby provide a digital signal. A first image memory 2 is connected to the output of the A/D converter 1 for storing the digital signal supplied to the memory 2 by the converter 1. The first image memory 2 has storage locations capable of storing $512 \times 512$ pixels for each of the three primary colors, red (R), green (G) and blue (B). In the following description, luminance data of each pixel of red (R), green (G) and blue (B) will be expressed by $f_R(x, y)$, $f_G(x, y)$ and $f_B(x, y)$, respectively, where x and y represent integers each ranging from 0 to 511.

A first digital interpolator 3 is connected to the output of the first image memory 2, in which convolution operations are performed with respect to the Y direction (vertical direction) of the coordinate based upon $f_R(x, y)$, $f_G(x, y)$ and $f_B(x, y)$ and the resultant data $g_R(x, y')$, $g_G(x, y')$ and $g_B(x, y')$ are written into a second image memory 4. In the following, only the convolution operation of $f_R(x, y)$ will be described since the other two convolution operations are similar.

When $y' = 0, 2, 4, \ldots, 1022$, $$g_R(x, y') = \sum_{l=-i/2}^{i/2} a_{2l} \cdot f_R(x, y'/2 - l) \quad (1)$$

When $y' = 1, 3, 5, \ldots, 1023$, $$g_R(x, y') = \sum_{l=-i/2}^{i/2} a_{2l+1} \cdot f_R\{x, (y' - 1)/2 - l\} \quad (2)$$

Figure 3:
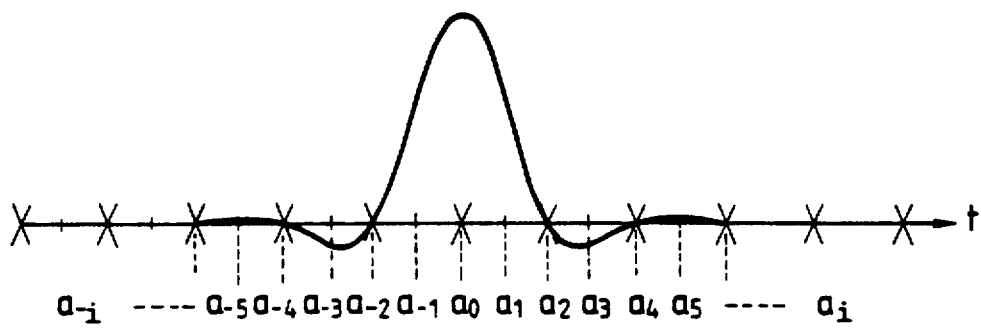
FIG. 3 is a waveform diagram for describing the operations of the system shown in FIGS. 1 and 2.

In the above expressions, y' represents integers ranging from 0 to 1023, l represents a loop variable, and ai represents the ith quantized value of an impulse response signal S as shown in FIG. 3.

The above interpolation operations are performed in a similar fashion with respect to $f_G(x, y)$ and $f_B(x, y)$ to obtain $g_G(x, y')$ and $g_B(x, y')$, respectively.

As a result of the interpolation operations performed relative to the Y-direction, the video signal has 1024×512 pixels. Such video signals are written into the second image memory 4. The output of the second image memory 4 is supplied through a second digital interpolator 5 to a digital-to-analog (D/A) converter 6. In the second digital interpolator 5, further convolution operations relative to the X-direction (lateral direction) are performed for $g_R(x, y')$, $g_G(x, y')$ and $g_B(x, y')$ stored in the second image memory 4 to obtain $h_R(x', y')$, $h_G(x', y')$ and $h_B(x', y')$, respectively. The resultant data are supplied to the D/A converter 6.

In the following, only to the convolution operation for $g_R(x, y)$ will be described, since the other two are similar.

When $x' = 0, 2, 4, \ldots, 1022$, $$h_R(x, y') = \sum_{l=-i/2}^{i/2} a_{2l} \cdot g_R(x'/2 - l, y') \quad (3)$$

When $x' = 1, 3, 5, \ldots, 1023$, $$h_R(x, y') = \sum_{l=-i/2}^{i/2} a_{2l+1} \cdot g_R\{(x' - 1)/2 - l, y'\} \quad (4)$$

In the above expressions, x' represents integers ranging from 0 to 1023 and l represents a loop variable as in the case in expressions (1) and (2). Similarly, ai represents the ith quantized value of the impulse response signal as shown in FIG. 3. The curve of FIG. 3 may be expressed as:

$$\rho(t) = \sqrt{2} \sum_{k=-\infty}^{\infty} (-3 + 2\sqrt{2})^{|k|} \cdot \psi(t - k)$$

Hence, $$\psi(t) = \begin{cases} \frac{1}{2}\left(t + \frac{3}{2}\right)^2, & -\frac{3}{2} \leq t \leq -\frac{1}{2} \\ \frac{3}{4} - t^2, & -\frac{1}{2} \leq t \leq \frac{1}{2} \\ \frac{1}{2}\left(t - \frac{3}{2}\right)^2, & \frac{1}{2} \leq t \leq \frac{3}{2} \\ 0, & \text{other range} \end{cases}$$

The abscissa "t" is as follows: for $t = i/2$, $\rho(t) = a[i]$. From this equation, $a[i] = \rho(i/2)$, $i = -N, \ldots, O, \ldots, N$, and k is a constant.

The above interpolation operations are performed in a similar fashion with respect to $g_G(x, y')$ and $g_B(x, y')$ to obtain $h_G(x', y')$ and $h_B(x', y')$, respectively. As a result of the interpolation operations performed relative to the X-direction, the video signal has 1024×1024 pixels. The video signal having 1024×1024 pixels is subjected to D/A conversion in the D/A converter 6 and the resultant fine analog video signal is supplied to a CRT or printer (not shown).

Another embodiment of the invention will next be described with reference to FIG. 2.

Figure 2:
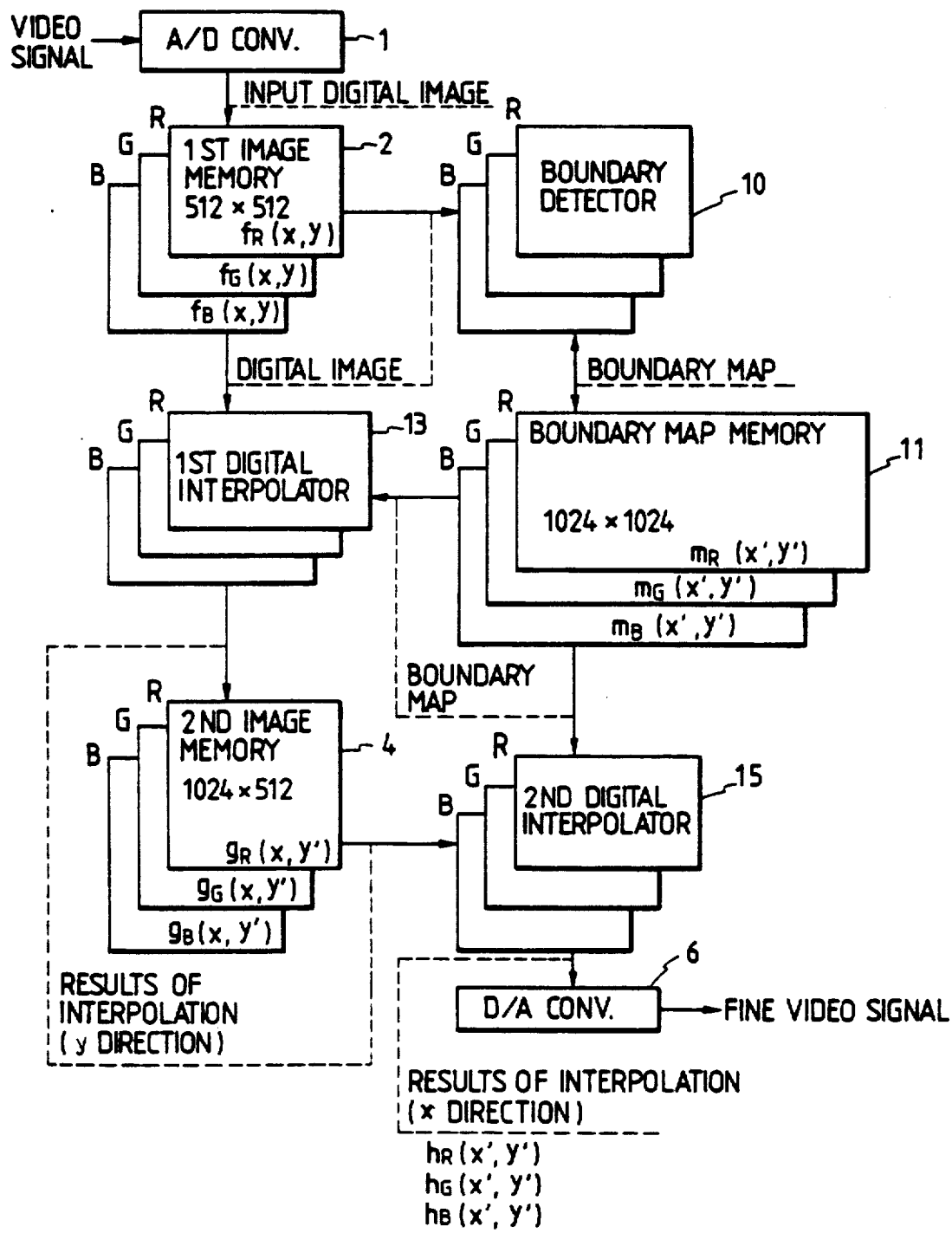
FIG. 2 is a block diagram showing a video signal processing system according to another embodiment of the present invention.

The embodiment shown in FIG. 2 includes a boundary detector 10 and a boundary map memory 11 in addition to the arrangement shown in FIG. 1. Digital interpolators 13 and 15 shown in FIG. 2 correspond respectively to the digital interpolators 3 and 5 shown in FIG. 1. However, supplemental functions are imposed on the digital interpolators 13 and 15, since the boundary detector 10 and the boundary map memory 5 are supplemented. The remaining components are identical both in function and connection to those shown in FIG. 1. Hence, by assigning the same reference numerals as those shown in FIG. 1 to the corresponding components, duplicate description is omitted herein.

The boundary detector 10 is connected to the output of the first image memory 2. The detector 10 initially performs the operation defined by the following equation based upon the contents stored in the first image memory 2. The following operation is performed to derive a change in amount $\Delta f_R(x, y)$ from $f_R(x, y)$. Other changes in the amounts are similarly derived.

$$\Delta f_R(x, y) = \partial^2 f_R/\partial x^2 + \partial^2 f_R/\partial y^2 \approx f_R(x + 1, y) + \quad (5)$$

$$f_R(x, y + 1) + f_R(x - 1, y) + f_R(x, y - 1) - 4f_R(x, y)$$

When the absolute value of the change in the quantity $\Delta f_R(x, y)$ thus obtained exceeds a threshold value, a decision is made that a boundary is present and a value "1" is written in the corresponding storage location $m_R(2x, 2y)$ of the boundary map memory 11. The boundary map memory 11 has a storage capacity for storing 1024×1024 pixels. While it is possible to switch the operations of the digital interpolators 13 and 15 from the fact that the value "1" in the boundary map memory 11 indicates the boundary, such is not implemented, but the processing steps illustrated in FIG. 4 will subsequently be carried out.

Figure 4:
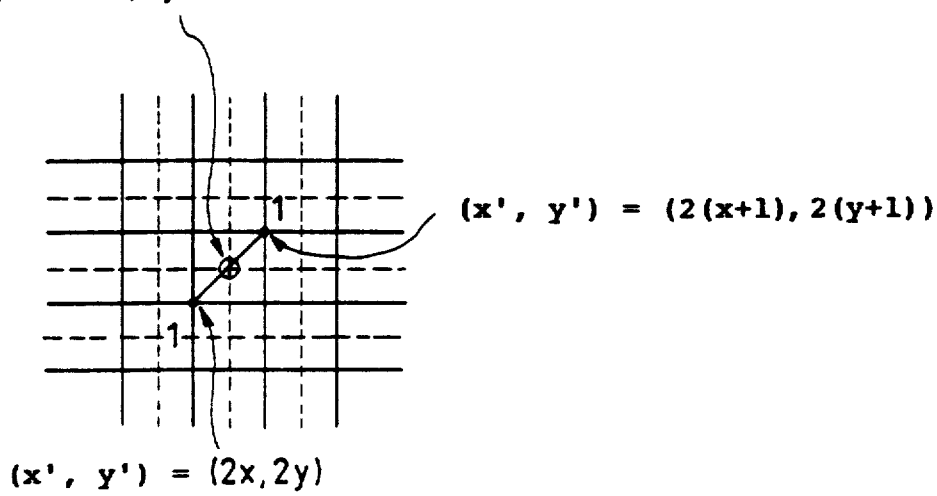
FIG. 4 is a coordinate diagram for describing the operations of the system shown in FIGS. 1 and 2.

Specifically, with respect to the points identified by the coordinate $(2x \pm 1, 2y \pm 1)$, the points complying with $m_R(2x, 2y) = $ "1" and $m_R\{2(x+\alpha), 2(y+\beta)\} = $ "1" are searched out of the points on the coordinate $(2x \pm 1, 2y \pm 1)$, whereupon the processing is performed so as to make $m_R(2x+\alpha, 2y+\beta)$ equal to "1", wherein $\alpha=0$, $-1$, $1$, and $\beta=0$, $-1$, $1$. In the case of FIG. 4, with respect to the point on the coordinate $(2x+1, 2Y+1)$, $m_R$ becomes $m_R(2x, 2y)=$ "1" and $m_R\{2(x+1), 2(y+1)\}=$ "1". Therefore, the point on the coordinate $(2x+1, 2y+1)$ is made to be "1". That is, FIG. 4 indicates the case where $\alpha=1$, and $\beta=1$ with respect to the point on the coordinate $(2x+1, 2y+1)$. The same processing steps are further carried out with respect to the remaining values of $\alpha$ and $\beta$ and to $m_G$ and $m_B$. The processing steps performed in the second stage mean that the portion where the changes detected by the expression (5) frequently occur is treated as a boundary for the entire region.

Referring to the boundary map memory 11, the digital interpolator 13 performs the interpolations indicated by expressions (1) and (2) upon scanning the image memory 2. During the interpolation processings, when $m_R(2x, y'o)=$ "1" and the point on the coordinate $(x, y')$ is scanned, all of $f_R(x, y'/2-1)$ and $f_R\{x, (y'-1)/2-1\}$ which correspond to $1>y'-y'o$ are replaced with $f_R(x, y'o)$, where $y'o$ is an integer representing the Y coordinate of the boundary. This replacement means an emphasis of the boundary resulting from the termination of the interpolation processing. Other than this replacement operation, the digital interpolator 13 is the same as the digital interpolator 3 shown in FIG. 1.

Similarly, while referring to the boundary map memory 11, the digital interpolator 15 performs the interpolations indicated by expressions (3) and (4) upon scanning the image memory 4. During the interpolation processings, when $m_R(x', y')=$ "1" and the point on the coordinate $(x'o, y')$ is scanned, all of $f_R(x'/2-1, y')$ and $f_R\{(x'-1)/2-1, y'\}$ which correspond to $1>x'-x'o$ are replaced with $f_R(x'o, y')$, where $x'o$ is an integer representing the X coordinate of the boundary. This replacement also means an emphasis of the boundary resulting from the termination of the interpolation processings. Other than this replacement operation, the digital interpolator 15 is the same as the digital interpolator 5 shown in FIG. 1.

The flow charts of FIGS. 5A to 5E will now be described.

Figure 5A:
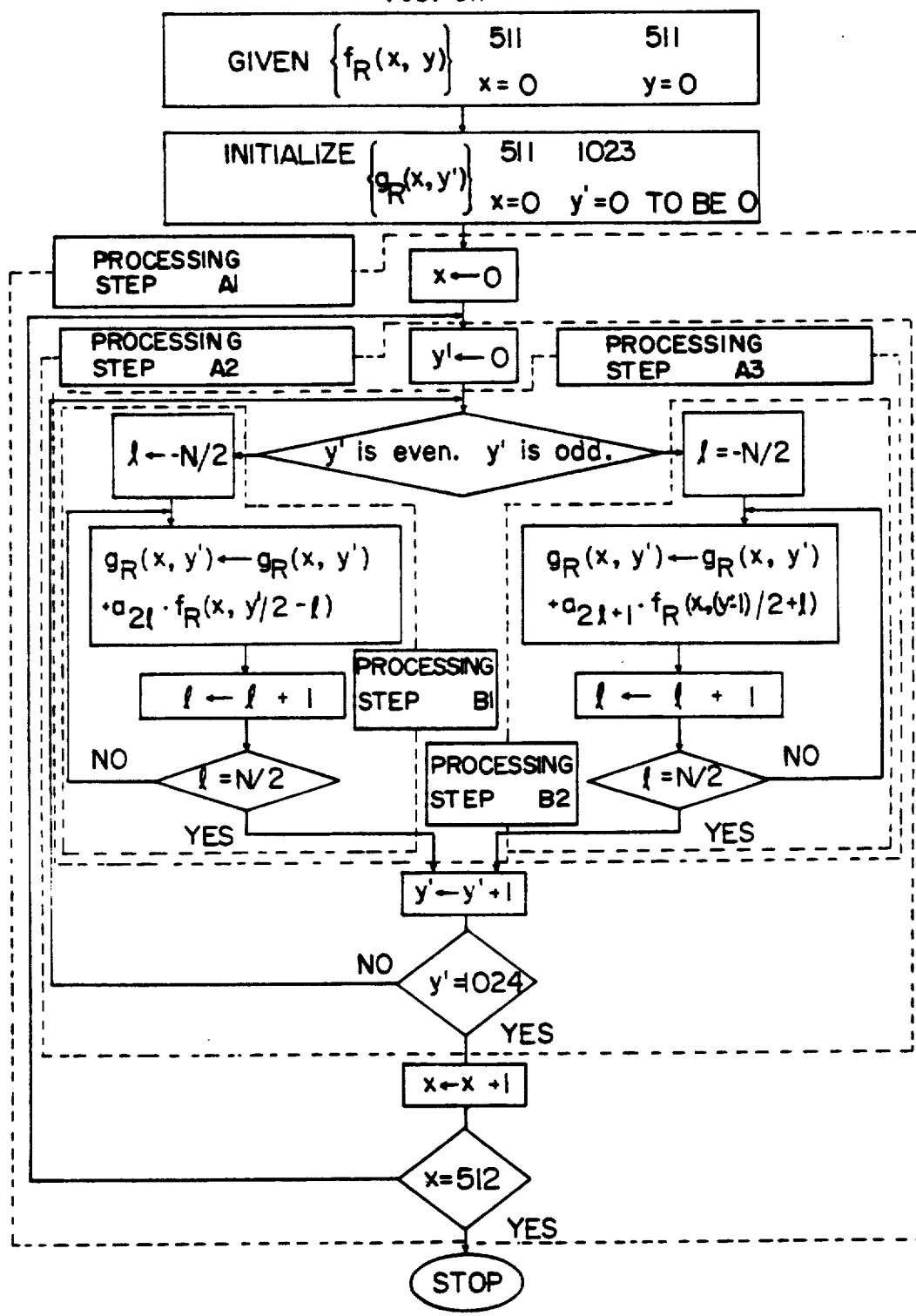

FIG. 5A shows a Flow Chart for implementing the operation of Equations (1) and (2). Given image data (red components of an image for example) are expressed by $\{f_R(x,y)\}x=0, 511$ $y=0, 511$ where x denotes the horizontal index and y denotes the vertical index of a rectangular coordinate system. The control is performed by a triple loop. The outer loop is controlled by $x=0$ to 511. The middle loop is controlled by $y'=0$ to 1023. The inner loop is controlled by $1=-N/2$ to $N/2$.

The loop control variables x and y are implemented by digital binary counters. According to the value of y', two different processes are applied to the data $\{f_R(x,y)\}x=0, 511$ $y=0, 511$ to obtain resulting data $\{g_R(x,y')\}x=0, 511$ $y'=0, 1023$. If y' is even, a resulting data $g_R(x,y')$ is assigned to the sum of $\{f_R(x,y'/2+1)\}$ $1=-N/2,N/2$ weighted by $\{a_2\}$, $1=-N/2,N/2$ according to the control by index 1. If y' is odd, a resulting data $g_R(x,y')$ is assigned the sum of $\{f_R(x,(y'0-1)\}/2+1)\}$ $1=-N/2,N/2$ weighted by $\{a_{2+1}\}$ $1=-N/2,N/2$ according to control by index 1.

Thus, the resulting data are assigned weighted sums of the given data. The resulting image is an extended image as represented by the given image data in the vertical direction.

Figure 5B:
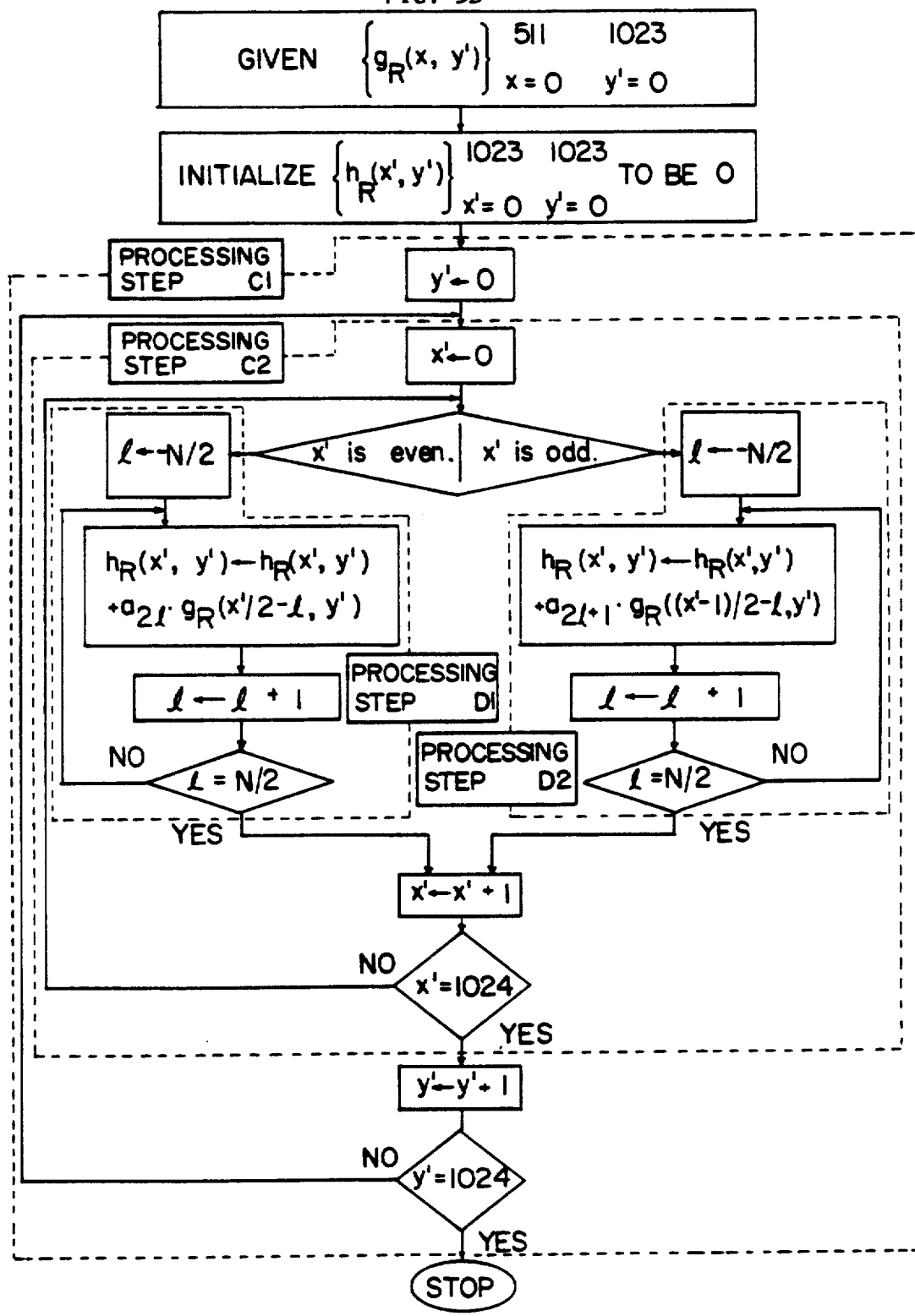

FIG. 5B shows a Flow Chart for implementing the operation of Equations (3) and (4). Given image data (red components of an image for example) are expressed by $\{g_R(x,y')\}x=0, 511$ $y'=0, 1023$ where x denotes the horizontal index and y' denotes the vertical index. The control is performed by a triple loop. The outer loop is controlled by $y'=0$ to 1023. The middle loop is controlled by $x'=0$ to 1023. The inner loop is controlled by $1=-N/2$ to $N/2$.

The loop control variables x' and y' are implemented by digital binary counters. According to the value of x', two different processes are applied to the data $\{g_R(x,y')\}$ $x,y')\}$ $x=0, 511$ $y'=0, 1023$ to obtain resulting data $\{h_R(x', y')\}x'=0, 1023$ $y'=0, 1023$. If x' is even, a resulting data $h_R(x', y')$ is assigned the sum of $\{g_R(x'/2-1,y')\}$ $1=-N/2, N/2$ weighted by $\{a_{2l}\}1=-N/2,N/2$ according to the control by index 1. If x' is odd, a resulting data $h_R(x',y')$ is assigned the sum of $\{f_R((x'-1)/2-1,y')\}$ $1=-N/2,N/2$ weighted by $\{a_{2l+1}\}1=-N/2, N/2$ according to the control by index 1.

Thus, the resulting data are assigned weighted sums of the given image data. The resulting image is an extended image of the given image as represented by the horizontal direction.

Figure 5E:
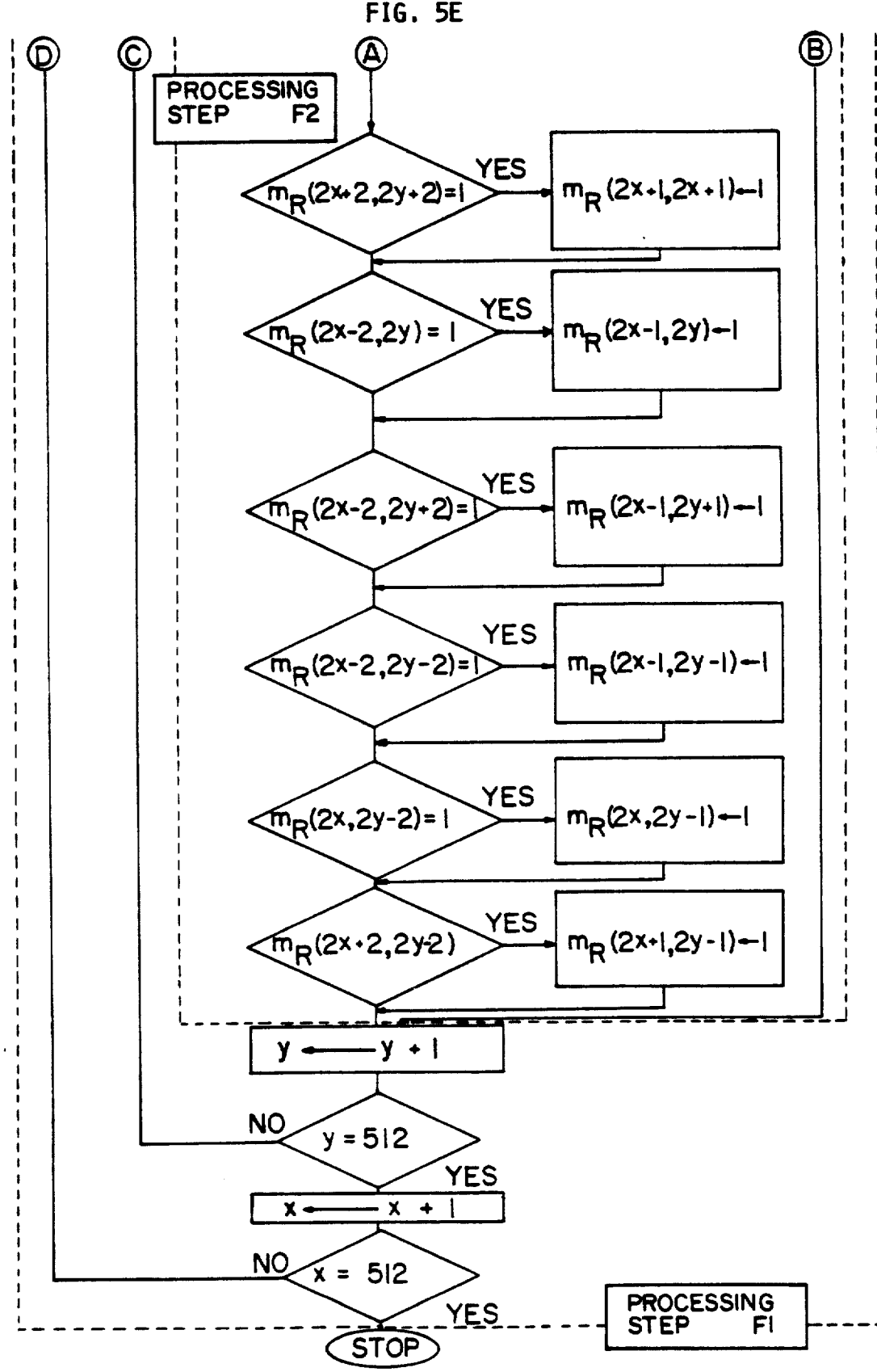

FIGS. 5D and 5E show a Flow Chart for implementing the boundary detection operation. Given image data (red components of an image for example) are expressed by $\{f_R(x,y)\}x=0, 511$ $y=0, 511$ where x denotes the horizontal index and y denotes the vertical index. This whole process is composed of two parts.

In part 1, boundary points on the given image $\{f_R(x,y)\}$ $x=0, 511$ $y=0, 511$ are detected and recorded in $\{m_R(2x,2y)\}x=0, 511$ $y=0, 511$. In part 2, the detected boundary points are extended onto $\{m_R(x',y')\}$ $x=0, 1023$ $y'=0, 1023$ by interpolating $\{m_R(2x,2y)\}x=0, 511$ $y=0, 511$.

Part 1 is a double control loop. The outer loop is limited by $x=0$ to 511. The inner loop is controlled by $y=0, 511$. For each pixel $(x, y)$, Laplacian $\Delta f_R(x,y)$ is evaluated by using $f_R(x,y)$ itself and the surrounding four pixels. If the $\Delta f_R(x,y)$ is greater than a specified threshold H the pixel $(x,y)$ is judged as a boundary point and then $m_R(x',y')$ where $x'=2x$ and $y'=2y$ is set as 1 to record it as a boundary point.

Part 2 is also a double control loop. The outer loop is $x=0$ to 511. The inner loop is limited by $y=0, 511$. For each pixel at $(x', y')=(x, y)$, if $m_R(x', y')=1$, i.e. a boundary point, and if a nearest pixel by one step is a boundary point, the intermediate pixel between those two points is judged as a boundary point. Thus, the boundary points on the 1023 by 1023 plane, are determined.

FIG. 5C shows a Flow Chart for implementing the image interpolation in the vertical direction with attention to the boundary points. Given image data (red components of an image for example) are expressed by $\{f_R(x,y)\}x=0, 511$ $y=0, 511$ where x denotes the horizontal index and y denotes the vertical index. A map of boundary points $\{m_R(x',y')\}x'=0, 1023$ $y'=0, 1023$ is provided wherein $m_R(x',y')=1$ means that the pixel $(x',y')$ is a boundary point.

The Flow Chart of FIG. 5C is a modified version of the Flow Chart of FIG. 5A with attention to the boundary points. In the modification, if there is a boundary point within the range of resulting pixels which are produced depending on a pixel in the given image, the value of the pixel in the given image is made not to affect the resulting pixels beyond the nearest boundary point in both forward and backward directions of y'. The variables BF0 and BF1 are flags. BF0 is set as 1 if there is any boundary point within the range in the backward direction. BF1 is set as 1 if there is any boundary point within the range in the forward direction.

Variables T0 and T1 hold the value of the nearest pixel in the backward and forward direction, respectively. Variables U0 and U1 represent the values on which the resulting pixel should be dependent. If there are no boundary points within the range, U0 and U1 are set as the ordinary value $f_R(x,y'/2-1)$ or $f_R(x,(y'-1)/2-1)$. Otherwise U0 and U1 are set as T0 and T1 respectively.

Convolution operations performed according to the invention produce an improved resolution for the following reasons. Assuming an image originally displayed with 512×512 picture elements or pixels is to be converted to a corresponding image displayed with 1024×1024 picture elements. The number of the picture elements is increased four times through the present conversion. However, if a picture element of the original image is merely copied to provide four image elements instead of one in the converted image with no processing, the resolution would not be improved.

The invention does not merely copy an image element several times. Instead, on the assumption that the original image has a smoothly-varying luminance, the original image is subjected to a processing so that the converted result or rather the converted image is an image obtained by an interpolation of the original image in accordance with a smooth function. Therefore, the resolution is improved for an image having a smoothly-varying luminance.

Further, in the present system the formation of a boundary line between a smoothly-varying area and another smoothly-varying area, is intentionally prevented by means of an influence of one smoothly-varying area on the other, thereby obtaining a still further improved resolution.

The interpolation system according to the invention is represented by the equations (1) to (4) which will now be explained in more detail, whereby the value N in all four equations (1) to (4) and in FIG. 3 is the same. The value N represents a natural number indicating a length $(2N+1)$ of the impulse response $a[-N], \ldots, a[0], \ldots, a[N]$ in FIG. 3. N is set in accordance with the accuracy required for the interpolation result. For example, if a permissible error for the interpolation result is 1/1000. "N" satisfying the following equation: $|a[N]| \leq 1/1000$ is adopted. In this case, N is equal to 4.

The equations (1) and (2) are used to perform a conversion operation of information stored in memories 2 and 4. The respective information represents an image divided into rows and columns. The rows extend in the x-direction of a rectangular coordinate system. The columns extend in the y-direction of said coordinate system. Each row contains, e.g. 512 pixels. Each column contains e.g. 512 pixels. The column information is stored in memory 2. The row information is stored in memory 4. The conversion operation increases the number of pixels in each direction, e.g. by doubling the number of pixels by interpolation between neighboring pixels.

Image information stored in the memory 2 as shown in FIG. 1, is represented by $f(x,y)$, wherein x represents a column number in the x-direction, and wherein y represents a row number in the y-direction. The respective numbers start from 0 and each of the respective values x and y is an integer from 0 to 511.

The equation (1) is used to calculate even rows in the y-direction stored in the memory 4, and the equation (2) is used to calculate odd rows in the y-direction also stored in memory 4 by the processing steps shown in FIG. 5A.

The calculation is performed by successively obtaining a value of each pixel information in the memory 4 by a "processing step A1".

A processing step A2 is successively performed on each column in the x-direction stored in the memory 4.

A processing step A3 is successively conducted on each point in the y-direction stored in memory 2.

A processing step B1 is conducted if a point to be calculated is on an even row $(y'=0,2,4,\ldots,1022)$, and a processing step B2 is conducted if the point is on an odd row $(y'=1, 3, 5, \ldots, 1023)$.

Figure 6:
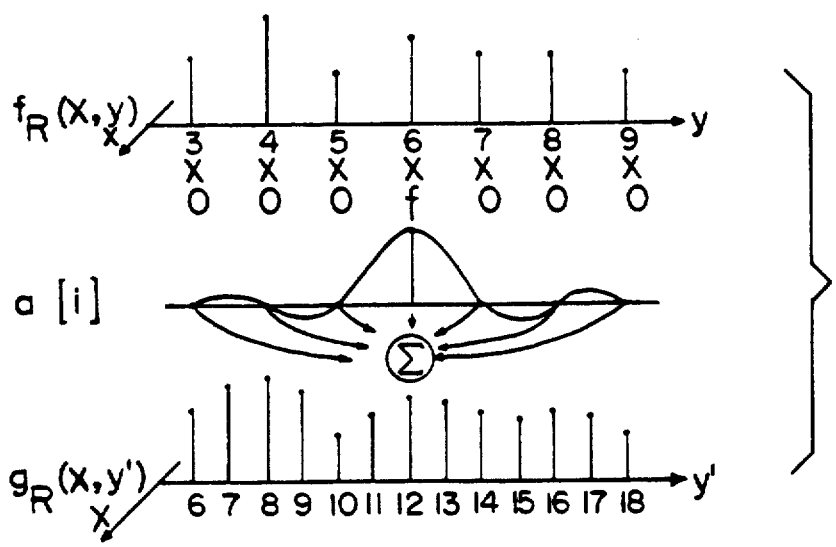
FIGS. 6 to 12 are graphs illustrating the following explanations of the processing steps performed according to the invention.

The processing step B1 involves a convolution-calculated result signal values $f_R(x,(y'/2)-N/2+1), \ldots f_R(x, (y'/2)+N/2))$ of N in the y-direction which has a centered position $(x,y'/2)$ in the memory 2 and values $a[-N], \ldots, a[-4], a[-2], a[0], a[2], a[4], \ldots, a[N-1]$ which are obtained by an impulse response as shown in FIG. 3 are stored as a calculation result $g_R(x, y')$ in the memory 4 shown in FIG. 1. The calculation processing steps A1, A2, A3 and B1 are illustrated in FIG. 6.

Figure 7:
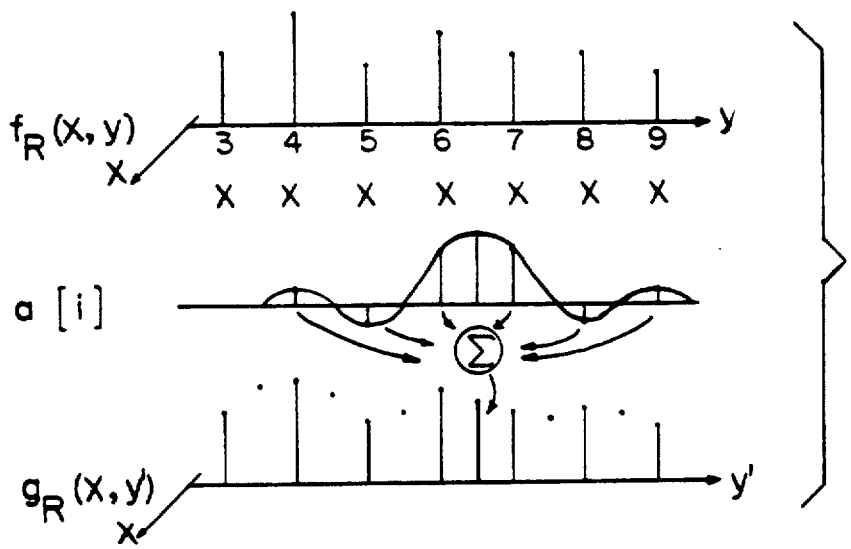

Referring to FIG. 7, a processing step B2 involves a convolution-calculated result between signal values $f_R(x, (y'/2)-N/2), \ldots, f_R(x,(y/2)-1+N/2))$ of N in the y-direction which has a centered position $(x,y)=(x,(y'/2)-1)$ in the memory 2 and values $a[-N+1], \ldots, a[-3], a[-1], a[1], a[3], a[5], \ldots, a[N-1]$ which are obtained by an impulse response as shown in FIG. 3, are stored as a calculation result $g_R(x,y')$ in the memory 4, as shown in FIG. 1.

Through the above processings, a video signal is enlarged twice in the y-direction, please see FIG. 5B.

The equations (3) and (4) represent a converting operation for outputting as a digital video signal, an image of 512 lateral pixels and 1024 longitudinal pixels stored in the memory 4, shown in FIG. 1 while increasing the number of the pixels in the x-direction twice.

The digital video signal is represented as $h(x', y')$. Each of the respective values x' and y' of the digital video signal has an integer value from 0 to 1023 because the image stored in the memory shown in FIG. 1, is outputted as the digital video signal, while the number of the pixels in the x-direction, namely of the lateral pixels, is increased twice.

The equation (3) is used to calculate an even column in the x-direction for the digital video signal, and the equation (4) is used to calculate an odd column in the x-direction for the digital video signal.

The calculation is performed by successively obtaining a value of each pixel of the digital video signal with a processing step C1.

A processing step C2 is successively performed on each row in the y-direction of the digital video signal.

A processing step C3 as described below is successively performed on each pixel in the x-direction of the digital video signal.

A processing step D1 is performed if a pixel to be calculated is in an even column $(x'=0,2,4,\ldots,1022)$, and a processing step D2 is performed if the pixel is in an odd column $(x'=1, 3, 5, \ldots 1023)$.

The processing step D1 involves convolution-calculated result between signal values $f_R((x'/2)-1-N/2,y'), \ldots f_R((x'/2)+N/2,y')$ of $(N+1)$ in the x-direction which has a centered position $(x'/2,y')$ in the memory 4 as shown in FIG. 1 and values, $a[-N], \ldots, a[-4], a[-2], a[0], a[2], a[4], \ldots, a[N]$ which are obtained by an impulse response as shown in FIG. 3, are outputted as a digital video signal $h(x',y')$.

The processing step D2 involves a convolution-calculated result between signal values $f_R((x'/2)-1-N/2,y'), \ldots f_R((x'/2)-1+N/2,y')$ of $(N+1)$ in the x-direction which has a centered position $((x'/2)-1y')$ in the memory 4 as shown in FIG. 1 and values $a[-N+1], \ldots, a[-3], a[-1], a[1], a[3], a[5], \ldots, a[N-1]$ which are obtained by an impulse response as shown in FIG. 3, are outputted as a digital video signal $g_R(x, y')$.

The above processing steps twice enlarge the video signal in the x-direction. As a result, the processing steps represented by the equations (1) to (4) make sure that the original video signal stored as 512×512 pixels in the memory 2, as shown in FIG. 2, is outputted as a digital video signal represented by 1024×1024 pixels.

An algorithm for determining a boundary line between neighboring image areas will now be described, see FIGS. 5D and FIG. 5E.

A processing step E1 is first carried out, and then a processing step F1 is carried out, whereby a boundary map of 1024 lateral pixels and 1024 longitudinal pixels to be stored in a memory 11, shown in FIG. 2, is prepared on the basis of the video signal of 512 lateral pixels and 512 longitudinal pixels which have been stored in the memory 2, shown in FIG. 2.

When the processing step E1 is completed all points or storage locations in the memory 11, shown in FIG. 2, are set to a sign "0" which represents "non-boundary". Thereafter, a processing step E2 is performed on each point (x, y) of the video signal of 512 lateral pixels and 512 longitudinal pixels which are stored in the memory 2, shown in FIG. 2.

The processing step E2 involves subjecting each point (x, y) to a calculation represented by equation (5). If an absolute value of the calculated result is above a value H, which is beforehand set, $m_R(x',y')$ where $x'=2x$ and $y'=2y$ in the memory 11 shown in FIG. 2, is set to a sign "1" which represents a "boundary".

After the processing step F1 has been completed, the processing F2 is performed on each point of $(x',y')=(2x,2y)$ of the boundary map stored in the memory 11, shown in FIG. 2, if a value $m_R(x',y')$ where $x'=2x$ and $y'=2y$ at the point is "1".

Figure 8:
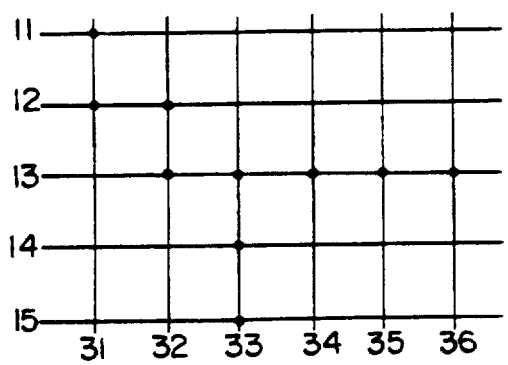

The processing step F2 involves the following: Introducing a 5×5 area having a centered position $(x',y')=(2x,2y)$: if a point $m_R(x',y')$, where $(x',y')=(2x-2, 2y-2)$, is "1", then $m_R(x',y')$, where$(x-',y')=(2x-1,2y-1)$ is set to "1", if a point $m_R(x',y')$, where $(x',y')=(2x-2,2y)$, is "1", then $m_R(x',y')$, where $(x',y')=(2x-1,2y)$, is set to "1"; if a point $m_R(x',y')$, where $(x',y')=(2x-2,2y+2)$, is "1", then $m_R(x',y')$, where $(x',y')=(2x-1, 2y+1)$, is set to "1"; if a point $m_R(x',y')$, where $(x',y')=(2x, 2y+2)$, is "1", then $m_R(x',y')$, where $(x', y')=(2x, 2y-1)$, is set to "1"; if a point $m_R(x',y')$, where $(x',y')=(2x, 2y-2)$, is "1", then $m_R(x',y')$, where$(x',y')=(2x, 2y+1)$, is set to "1"; if a point $m_R(x',y')$, where $(x',y')=(2x+2, 2y-2)$, is "1", then $m_R(x', y')$, where $(x',y')=(2x+1, 2y+1)$ is set to "1"; if a point $m_R(x',y')$, where$(x',y')=(2x+2,2y)$ is "1", then $m_R(x',y')$, $(x',y')=(2x+1, 2y)$ is set to "1"; and if a point $(2x+2, 2y+2)$ is "1", then $m_R(x',y')$, where $(x',y')=(2x+1, 2y+1)$, is set to "1". Thus, a boundary has been determined. FIG. 8 illustrates an example $$\{f_R(x, y)\}_{x=0, y=0}^{511, 511}$$

Referring to FIG. 5C, an adverse influence of the interpolation at the boundary line is removed as follows. In the basic interpolation system shown in FIG. 1, the first and second digital interpolation portions 3 and 5 are modified to first and second digital interpolation portions 13 and 15 as shown in FIG. 2 in order to utilize the information available for a boundary line between neighboring areas.

The first interpolation portion 13 performs a calculation by successively obtaining a value for each point in the memory 4, shown in FIG. 2 by performing a processing step G1.

Then, each column in the x-direction in the memory 4 is successively subjected to a processing step G2.

Then, each point in the y-direction in the memory 4 is successively subjected to a processing step G3.

A processing step H1 is performed if a point to be calculated is on an even row $(y'=0, 2, 4, \ldots, 1022)$ and a processing step H2 is performed if a point to be calculated is on an odd row $(y'=1,3,5, \ldots, 1023)$.

The processing step H1 involves a convolution-calculated result between signal values of $(N+1)$, $f_R(x, (y'/2)-N/2), \ldots, f_R(x,(y'/2)+N/2)$, which has a centered position $(x,y)=(x,y'/2)$ in the memory 2, and an alignment length N in the y-direction. Further, the value of an element outside of a position in the memory 2 positionally corresponding to a boundary point which is nearest to the position $(x',y')=(2x, y')$ on the boundary map, is replaced by the value $f_R(x, y'/2)$ of an element of a point in the memory 2 which positionally corresponds to the boundary point, and a $[-N], \ldots a[-4], a[-2], a[0], a[2], a[4], \ldots, a[N]$ which are obtained by a response to an impulse shown in FIG. 3, is stored as a calculation result $g_R(x',y)$ in the memory 4.

The processing step H2 involves a convolution-calculated result between a series of signal values of $(N+1)$ aligned in the y-direction, $f_R(x,(y'/2)-1-N/2), \ldots, f_R(x,(y'/2)-1+N/2)$, which has a centered position $(x,y)=(x,(y'/2)-1)$ in the memory 2 and an alignment length N in the y-direction. Further, the value of an element outside of a position in the memory 2 positionally corresponding to a boundary point, which is nearest to the position $(x, y')$ on the boundary map, is replaced by the value of an element of a point in the memory 2 which positionally corresponds to the boundary point, and $a[-N+1], \ldots, a[-3], a[-1], a[1], a[3], a[5], \ldots, a[N-1]$ which are obtained by a response to an impulse shown in FIG. 3, is stored as a calculation result $g_R(x',y)$ in the memory 4.

A calculation in the second interpolation portion 15 as shown in FIG. 2 is performed by successively obtaining a value of each point in the digital video signal through the processing step J1.

When the processing step J1 has been completed, each point in the y-direction in the memory 4 is successively subjected to a further processing step J2, wherein each column in the x-direction in the memory 4 is successively subjected to processing, followed by processing step J3.

A processing step K1 is conducted if a point to be calculated is an even-number $(x'=0,2,4, \ldots, 1022)$, and a processing step K2 as described below is conducted if a point to be calculated is an odd-number ($x'=1,3,5,\ldots,1023$).

The processing step K1 provides a convolution-calculated result between the signal values of $(N+1)$, $g_R((x'/2)-N/2,y'), \ldots, g_R((x'/2)+N/2,y')$, which has a centered position $(x'/2,y')$ in the memory 4 as shown in FIG. 2 and an alignment length N in the x-direction and in which the value of an element outside of a point in the memory 2 positionally corresponding to a boundary point which is nearest to the position $(x', y')$ on the boundary map- is replaced by the value of an element of a position in the memory 2 which positionally corresponds to the boundary point, and positions corresponding to the positions of the signals in the memory 2 as shown in FIG. 2 in the impulse response as shown in FIG. 3, a $[-N], \ldots, a[-4], a[-2], a[0], a[2], a[4], \ldots, a[N]$, is outputted as a digital output signal $h_R(x', y')$.

The processing step K2 provides a convolution-calculated result between a series of signal values of $(N+1)$ in the y-direction, $g_R((x'/2)-1-N/2,y'), \ldots, g_R((x'/2)-1+N/2,y')$, which has a centered position $((x'/2)-1,y')$ in the memory 4 as shown in FIG. 2 and in which the value of an element outside of a point in the memory 2 positionally corresponding to a boundary point which is nearest to the position $(x', y')$ on the boundary map is replaced by the value of an element of a position in the memory 2 which positionally corresponds to the boundary point, and positions corresponding to the positions of the signals in the memory 4 as shown in FIG. 2 in the impulse response as shown in FIG. 3, $a[-N+1], \ldots, a[-3], a[-1], a[1], a[3], a[5], \ldots, a[N-1]$, is outputted as a digital video signal $h(x',y')$.

Figure 9:
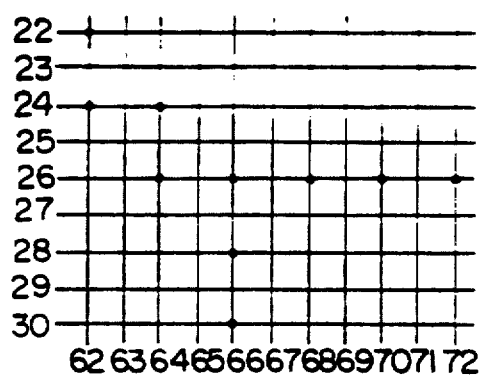

If points represented by a black dot satisfy a boundary condition, which means that a value calculated by using the above equation (5) is above the predetermined value H, the result is shown in FIG. 9 for example $$\{m_R(x', y')\}\begin{matrix}1023, & 1023 \\ x'=0, & y'=0.\end{matrix}$$

Such result is obtained by performing the above described processing steps E2.

Figure 10:
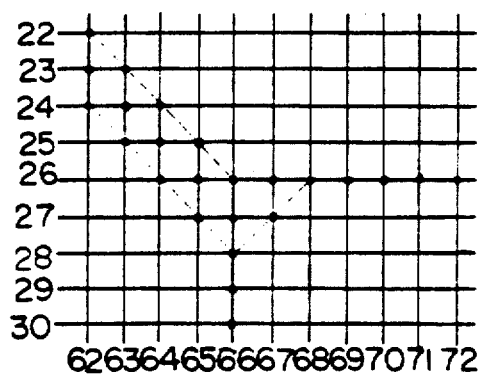

For performing the processing steps F1 and F2 for the above example, the respective results are shown in FIG. 10.

Figure 11:
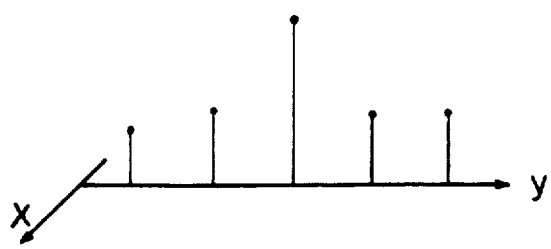
Figure 12:
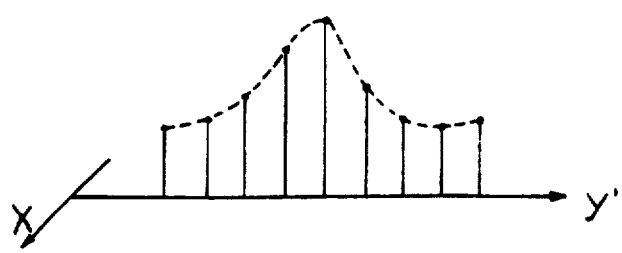

Assuming original signals are provided as shown in FIG. 11, application of the smoothly varying interpolation will yield the result shown in FIG. 12.

Although the invention has been described with reference to specific example embodiments, it will be appreciated that it is intended to cover all modifications and equivalents within the scope of the appended claims.

What we claim is:

1. A video processing system for processing a video signal to produce pixel data corresponding to an intermediate position between two neighboring pixels from pixel data of two neighboring pixels, each of said pixels being characterized by luminescence data, said system comprising: an input terminal for receiving said video signals, image memory means coupled to said input terminal for storing the video signal, and interpolation means connected to said memory means for receiving said video signal from said image memory means, said interpolation means comprising means for performing a convolution operation with respect to said luminescence data of the pixels contained in the video signal and with respect to an impulse response signal, said interpolation means producing pixel data corresponding to said intermediate position between two neighboring pixels.

2. The video signal processing system according to claim 1, further comprising a boundary map memory for storing a boundary wherein a change value on a coordinate of each of said pixel data corresponding to said intermediate position and said pixel data of two neighboring pixels is detected, and a change value greater than a threshold value is stored in said boundary map memory as a boundary value, and wherein when scanning said boundary map memory, the convolution operation is interrupted and the boundary is emphasized.

* * * * *